(12) United States Patent
Lee et al.

(10) Patent No.: US 8,184,592 B2
(45) Date of Patent: May 22, 2012

(54) METHOD, MEDIUM, AND SYSTEM FOR SEARCHING CROSSOVER ROUTER AND METHOD, MEDIUM, AND SYSTEM FOR RESERVING RESOURCES IN MOBILE NETWORK

(75) Inventors: Sung-hyuck Lee, Daegu (KR); Seong-ho Jeong, Seongnam-si (KR); Jong-ho Bang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 993 days.

(21) Appl. No.: 12/149,451

(22) Filed: May 1, 2008

(65) Prior Publication Data

US 2008/0205344 A1 Aug. 28, 2008

Related U.S. Application Data

(62) Division of application No. 10/968,364, filed on Oct. 20, 2004, now Pat. No. 7,860,059.

(30) Foreign Application Priority Data

Oct. 20, 2003 (KR) .................................. 2003-73177
Jan. 13, 2004 (KR) .................................. 2004-2472

(51) Int. Cl.
*H04W 36/00* (2009.01)
(52) U.S. Cl. ....................................... 370/331; 455/436
(58) Field of Classification Search .................. 370/331, 370/349; 455/436
See application file for complete search history.

(56) References Cited

U.S. PATENT DOCUMENTS

| | | | |
|---|---|---|---|
| 6,999,436 B2 | 2/2006 | Zheng et al. | |
| 7,161,929 B1 | 1/2007 | O'Neill et al. | |
| 7,362,728 B2 | 4/2008 | Isobe et al. | |
| 7,453,851 B2 | 11/2008 | Westphal et al. | |
| 2002/0057657 A1* | 5/2002 | La Porta et al. | 370/331 |
| 2002/0150062 A1* | 10/2002 | Zheng et al. | 370/331 |
| 2002/0167965 A1* | 11/2002 | Beasley et al. | 370/465 |
| 2002/0172207 A1* | 11/2002 | Saito et al. | 370/400 |
| 2003/0137962 A1* | 7/2003 | Tsirtsis et al. | 370/338 |
| 2004/0008689 A1* | 1/2004 | Westphal et al. | 370/395.21 |
| 2004/0125795 A1* | 7/2004 | Corson et al. | 370/356 |
| 2004/0213181 A1 | 10/2004 | Grech et al. | |
| 2005/0060418 A1 | 3/2005 | Sorokopud | |

OTHER PUBLICATIONS

G. Dommety, "Fast Handovers for Mobile 1Pv6", Jul. 11, 2001.
U.S. Appl. No. 10/968,364, filed Oct. 20, 2004, Sung-hyuck Lee, Samsung Electronics Co., LTD.
Restriction Requirement Action mailed Mar. 28, 2008 in parent case U.S. Appl. No. 10/968,364.

(Continued)

*Primary Examiner* — Brian Nguyen
(74) *Attorney, Agent, or Firm* — Staas & Halsey LLP

(57) ABSTRACT

A method, medium, and system for reserving resources in a mobile network. A mobile node reports a start of a handover to a present access router if the handover of the mobile node occurs, and the previous access router transmits specified session information to a candidate access router that has a possibility handling the mobile node's handover. A candidate crossover router, which performs a resource reservation work on a new path and a resource release on the previous path, is searched, and a localized resource reservation is established by exchanging a specified resource reservation message before the handover is completed if the candidate crossover router is determined. Accordingly, duplication of resources can be prevented, and a prompt resource reservation can be achieved during the handover.

8 Claims, 8 Drawing Sheets

OTHER PUBLICATIONS

Office Action mailed Aug. 4, 2008 in parent case U.S. Appl. No. 10/968,364.
Final Office Action mailed Feb. 4, 2009 in parent case U.S. Appl. No. 10/968,364.
Office Action mailed Sep. 4, 2009 in parent case U.S. Appl. No. 10/968,364.
Final Office Action mailed Mar. 30, 2010 in parent case U.S. Appl. No. 10/968,364.
Advisory Action mailed Jun. 11, 2010 in parent case U.S. Appl. No. 10/968,364.
U.S. Notice of Allowance mailed Aug. 19, 2010 in parent case U.S. Appl. No. 10/968,364.
U.S Office Action mailed Jul. 1, 2010 in parent case U.S. Appl. No. 10/968,364.

* cited by examiner

METHOD, MEDIUM, AND SYSTEM FOR SEARCHING CROSSOVER ROUTER AND METHOD, MEDIUM, AND SYSTEM FOR RESERVING RESOURCES IN MOBILE NETWORK

CROSS-REFERENCE TO RELATED APPLICATIONS

This application is a divisional of application Ser. No. 10/968,364 filed Oct. 20, 2004 now issued as U.S. Pat. No. 7,860,059 on Dec. 28, 2010, which claims priority benefit under 35 U.S.C. §119 from Korean Patent Application Nos. 10-2003-0073177, filed on Oct. 20, 2003, and 10-2004-0002472, filed on Jan. 13, 2004, the entire contents of which are incorporated herein by reference.

BACKGROUND OF THE INVENTION

1. Field of the Invention

The present invention generally relates to a method, medium, and apparatus for reserving resources when a handover occurs in a mobile network. More particularly, the present invention pertains to a method, medium, and apparatus for reserving resources by searching for a candidate access router and a candidate crossover router for an area where a mobile node will potentially move, and pre-reserve or re-reserve the appropriate resources through a router found through the search.

2. Description of the Related Art

As information and globalization ages draw near, research into active wireless Internet systems has increased. Wireless Internet can be briefly classified into fixed wireless Internet and mobile wireless Internet. Fixed wireless Internet is limited in mobility, but has superior transmission capacity and speed. Systems for WLAN (Wireless Local Area Network), B-WLL (Broadband Wireless Local Loop), LMDS (Local Multipoint Distribution Service), and Bluetooth, belong to the wireless fixed Internet. By contrast, the mobile wireless Internet, which is implemented by different types of systems in notebook computers and PCs, according to the generations of the mobile communication network, secures the mobility superiority, but is limited in transmission capacity and speed.

With the development of mobile communication networks, the mobile wireless Internet has developed from an initial form, such as CDPD (Cellular Digital Packet Data) using the 1st generation AMPS (Advanced Mobile Phone Service) network, to a service form using wireless application protocols such as WAP (Wireless Application Protocol), ME (Mobile Explorer) and I-mode, based on the 2nd or 2.5-generation IS-95/GSM network. The standardization of ALL IP mobile networks based on IMT-2000, which is the 3rd-generation mobile communication system, has progressed in stages, and it is expected that the IP-based standardization will be gradually carried out from the fields of IP-based core networks to wireless access networks and terminals.

The present ALL IP mobile network is the next-generation mobile communication network which has become a matter of great concern all over the world, with standardization work having progressed in the 3GPP (3rd Generation Partnership Project) around Northern Europe and in the 3GPP2 (3rd Generation Partnership Project 2) around North America. From these projects, many technical issues have been brought to light in the academic world, through various kinds of forums and through the standardization and development of the ALL IP mobile network carried out through various kinds of consortiums made up by world-famous mobile communication network providers, manufacturers developing network constituent elements, Internet service providers providing new Internet services, and manufacturers of IP packet network constituent elements.

In order to support the mobility in the mobile wireless network where the ALL IP is implemented, an MIP (Mobile IP) and a QoS (Quality of Service), securing a reliable transmission of data and multimedia traffic, are required. The reliable transmission of the multimedia traffic is supported by a pre-reservation of network resources, for which an RSVP (Resource Reservation Protocol) has been mainly used. However, since the present RSVP was not designed to take into consideration the mobility of wireless networks, a proper resource reservation cannot be made when MIP is implemented.

After the appearance of MIP, research for a resource reservation for mobile networks has continuously progressed, and the representative protocols are MRSVP (Mobile RSVP), RSVP-MP (RSVP Mobility Proxy), and CORP (method of Concatenation and Optimization for resource Reservation Path).

FIG. 1 illustrates paths for pre-establishing resources, according to the conventional MRSVP. MRSVP classifies resource reservation states into a passive reservation state and an active reservation state. The passive reservation state is a state where a resource has been previously reserved, and not presently in use, and the active reservation state is a state where the reserved resource is in use. A proxy agent is provided in an access router to manage the transmission of a user's mobile terminal or mobile node 10 from the passive reservation state to the active reservation state. The mobile node can move within a mobile network and accordingly changes its network access position. The proxy agent manages cells adjacent to a cell where the mobile node is positioned, and preemptively takes part in a multicast RSVP session through special reservation schemes, wherein traffic is not actually transferred.

Referring to FIG. 1, the mobile node 10 establishes a communication session with a correspondent node 20 through a path 1. The correspondent node 20 communicates with the mobile node 10 by connecting with the access router CAR included in a core network.

In this state, if a handover of the mobile node 10 occurs, the mobile node 10 transmits a specification message to adjacent access routers AR2, AR3, . . . , and ARn. The specification message includes a flow specification, which is to be transmitted to a remote proxy agent by the mobile node and a flow ID (Identification). Between the access routers AR2, AR3, . . . , and ARn, where a communication session is not currently established, and the correspondent node 20, the passive reservation state is set. If the mobile node 10 moves, it can extend the reservation path by changing a corresponding passive reservation state to an active reservation state and by transferring traffic through the active reservation state.

Although this solved the problem of time delay of the QoS re-establishment, MRSVP pre-reserves resources of adjacent cells where the mobile terminal may move in the mobile network, which may be short of resources, thereby wasting resources in the access network. The mobile node should keep a mobility specification that includes position information for all of the neighbors of the mobile node while the mobile node moves and as it establishes a communication session with the correspondent node 20. Since an intermediate router manages all state information about passive reservation states, unnecessary overhead occurs, which emphasizes a corresponding problem of the mobile network having limited scalability.

When the mobile node 10 moves, communication sessions between mobile node 10 and previous resources in a previous cell are not promptly released, thereby creating a double reservation being kept with respect to the same communication session, causing a waste of resources. As these handovers frequently occur, generating such double resource reservations, the resource availability of new communication sessions becomes disturbed.

FIG. 2 illustrates paths for establishing new resources through an address changing method, according to the conventional RSVP-MP. The RSVP-MP structure is mutually combined with hierarchical mobility management schemes of MIP, is provided with an RSVP-MP agent placed at MAP (Mobility Anchor Point) or in GFA (Gateway Foreign Agent), and performs an address change between an LCoA (Local Care-of-Address), which is an address of the access router, and an RCoA (Regional Care-of-Address), which is a global address of another address.

Referring to FIG. 2, the mobile node 10 establishes a communication session with a correspondent node 20 through path 1. If the mobile node 10 performs a handover from an area managed by AR1, which is currently connected to the mobile node 10, to an area managed by AR2, mobility 10 is allocated with CoA, a new temporary address, and requests a re-establishment of resource reservation according to the change of paths. If an end-to-end re-establishment of resources from the mobile node 10 to the correspondent node 20 is made, the resource re-establishment creates a time delay, preventing the mobile node 10 from being properly provided with QoS.

However, if the handover of the mobile terminal 10 occurs, the RSVP-MP structure performs communication by converting LCoA of the access network into RCoA that is a global address through an MP (Mobility Proxy) and using RCoA. Thus, according to the RSVP-MP structure, re-establishment of entire paths is not required, but only requires the path in a section between AR1 and MAP, in which LCoA is used, to be re-established. That is, RCoA is used from MAP to the correspondent node 20, and thus, even if a handover occurs, it is not required to re-establish the RSVP session from MAP to the correspondent node, but only requires the RSVP session to be re-established between the mobile node to MAP. Since RSVP-MP does not require the re-establishment of the end-to-end resource reservation, it can reduce time delays due to the limited required re-establishment of the RSVP-MP session.

Although RSVP-MP does not require the reestablishment of the end-to-end resource reservation, a time delay of as much as one round-trip time still occurs in order to establish the resource reservation, and a prompt release of the reservation state of the resources established through the old access router is not performed, thereby similarly again causing the double reservation of resources. If the handover frequently occurs, the handover still disturbs the resource use for new communication sessions due to the double resource maintenance. Since the RSVP-MP structure should be implemented in parallel to the hierarchical mobility management schemes of MIP, which have not yet been completed, it cannot be an independent protocol and, accordingly, may be changed as it is implemented.

FIG. 3 is a view illustrating a conventional CORP type RSVP path extending process through a hierarchical reservation path and path extending process using an optimized reservation path.

Referring to FIG. 3, the CORP type RSVP provides QoS by using a method of extending the existing RSVP path if a handover occurs. The CORP type RSVP uses a CRP (Concatenation for Reservation Path)r to extend the RSVP path.

The CRP type RSVP extends the RSVP path using PRPs (Pseudo Reservation Paths). The CRP type RSVP determines one representative BS (Base Station) among BSs (Base Stations) managed by one access router, and pre-reserves the resources for adjacent BSs.

Referring to FIG. 3, several access routers AR1, AR2, ..., ARn, which belong to the access network, manage respective areas area 1 to area n. Each respective area includes several cells, and a BS manages the respective cells. If the mobile node 10 performs a handover in the area managed by one access router, the BS that manages the cell that the mobile node 10 accordingly has reached, transmits a CRP information message (that is, information message) for informing BSs, of the adjacent cells, of the arrival of the mobile node at BSs, and makes the adjacent cells pre-reserve their resources.

The continuous extension of the RSVP path by CRP makes an infinite path or a loop path, and in order to prevent this, an ORP (Optimization for Reservation Path) is used along with CORP. Specifically, if a handover occurs within an area managed by one access router AR1, the handover is processed according to CRP, while if a handover occurs due to the mobile node's movement to another access router AR2, the mobile node 10 establishes a new RSVP session with the correspondent node 20. Accordingly, in the case of the handover occurring in one access router, resources can be promptly secured, and thus previous problems caused by the path extension can be solved with QoS being secured.

As described above, since CORP pre-reserves the resources of adjacent cells to which the mobile node will move and simultaneously establishes the end-to-end RSVP session in a mobile network having insufficient resources, the inefficient waste of resources occurs in the access network. Since CORP uses a multicast method when establishing a new session by extending the path, and since there should also be a new RSVP session established from a new access router to the correspondent node 20 whenever the mobile node moves to another access router, trouble occurs in scalability of the network. Although CORP releases old resources, unlike MRSVP, the release of the existing resources according to CORP includes the release of the existing resources up to the correspondent node 20, and thus a prompt process is not achieved and a new session establishments for other terminals are disturbed.

SUMMARY OF THE INVENTION

Embodiments of the present invention have been developed in order to solve the above drawbacks and other problems associated with the conventional arrangement. An aspect of the present invention is to provide a method, medium, and an apparatus for reserving resources which can promptly determine a candidate access router and a candidate crossover router and pre-reserve or re-reserve appropriate resources using refresh bits when a handover occurs.

The present invention can be applied to a mobile network that includes a mobile node, a correspondent node communicating with the mobile node through a specified network, a first access router for making the mobile node access the specified network, a second access router for handing over the mobile node, and a crossover router for establishing a new path through the second access router.

Additional aspects and/or advantages of the invention will be set forth in part in the description which follows and, in part, will be obvious from the description, or may be learned by practice of the invention.

To achieve the above and/or other aspects and advantages, embodiments of the present invention provide a method for searching for a crossover router in a mobile network having a mobile node, a correspondent node communicating with the mobile node through a specified network, a first access router enabling the mobile node to access the specified network, a second access router accepting the mobile node after being handed over from the first access router, and a crossover router for establishing a new path through the second access router, including the second access router transmitting a message including specified session information to an adjacent router positioned in a direction of the correspondent node on the new path, the adjacent router comparing a session ID included in the received message with a currently reserved session ID, comparing a logical interface number through which the message is received with a pre-stored logical interface number if the session Id and the reserved session ID are identical, and recognizing the adjacent router as the crossover router when it is confirmed from the received message that a handover of the mobile node occurs, if the pre-stored logical interface number and the logical interface number are not identical.

The adjacent router may compare a flow ID included in the message with an existing flow ID if the pre-stored logical interface number and the logical interface number are identical, and recognize the adjacent router as the crossover router when it is confirmed from the received message that the handover of the mobile node occurs, if the existing flow ID and the message flow ID are not identical. The adjacent router comparing of the session ID may include the adjacent router transmitting the message to a router in the direction of the correspondent node if the message session ID and the currently reserved session ID are not identical.

The method may include a confirming of whether the adjacent router, which is recognized as the crossover router, can perform a communication normal operation with the mobile node and the correspondent node, and a searching for another crossover router among adjacent routers on the new path formed through a routing protocol if it is confirmed that the adjacent router is in a failure state and cannot perform the normal communication operation.

The confirming of whether the adjacent router can perform the normal operation may include an old router of the crossover router on the new path transmitting a specified search message to the crossover router, and a recognizing that the crossover router is in the failure state if a confirmation message of the specified search message is not received in a specified time from the crossover router. The recognizing that the crossover router is in the failure state may further include a transmitting the confirmation message, from the crossover router, with a cookie of specified contents, and the old router confirming whether the confirmation message is an effective message may be performed by checking the cookie.

To achieve the above and/or other aspects and advantages, embodiments of the present invention may include a method for reserving resources in a mobile network having a mobile node, a correspondent node communicating with the mobile node through a specified network, and a first access router enabling the mobile node to access the specified network, including the mobile node reporting a start of a handover to the first access router if the handover of the mobile node occurs, the first access router transmitting specified session information to a candidate access router which has a possibility of handling the mobile node's handover after searching for the candidate access router, searching for a candidate crossover router to perform a resource reservation on a path through the candidate access router and a resource release on a path through the first access router, and establishing a localized resource reservation by exchanging a specified resource reservation message with a found candidate access router before the handover is completed.

The specified session information may include a session ID discriminating between respective sessions, a flow ID discriminating between respective data flows, and a mobility object indicating a mobility of the mobile node. In addition, the header portion of the specified resource reservation message may contain specified refresh bits, such that by setting a specified bit value within the refresh bits indicating a pre-reservation of resources and a reservation limit time for refreshing a state of a pre-reservation of resources.

The method may further include refreshing the resource reservation with the candidate access router if a resource pre-reservation state is held longer than the reservation limit time. Further, the searching for the candidate crossover router may include the candidate access router transmitting a specified message containing the specified session information to an adjacent router positioned in a direction of the correspondent node on the path, the adjacent router confirming whether messages having the same session ID are input through different logical interfaces, determining whether the handover occurs by confirming the mobility object if the messages having the same session ID are input through the different logical interfaces, and recognizing the adjacent router as the candidate crossover router if it is determined that the handover occurs.

The searching for the candidate crossover router further includes comparing a flow ID of a received message with an existing flow ID if the messages having the same session ID are input through the same logical interface, determining whether the handover occurs by confirming the mobility object if the flow ID of the received message and the existing flow ID are identical, and recognizing the adjacent router as the candidate crossover router if it is confirmed that the handover occurs.

The establishing of the localized resource reservation may include the candidate crossover router recognizing a resource pre-reservation state by confirming the refresh bits in a receiver-initiated type resource reservation, transmitting the reservation message corresponding to a path message if a sender between the candidate crossover router and the candidate access router transmits the path message to the receiver, and the sender, which has received the reservation message, establishing the resource pre-reservation by transmitting a confirmation message to the receiver. Further, the establishing of the localized resource reservation may include the candidate crossover router recognizing a resource pre-reservation state by confirming the refresh bits in a sender-initiated type resource reservation, and establishing the resource pre-reservation by transmitting a confirmation message corresponding to the reservation message if a sender between the candidate crossover router and the candidate access router transmits the reservation message to a receiver.

The candidate crossover router may establish the localized resource reservation with the candidate access router by not transmitting a message for the resource reservation received from the candidate access router in the direction of the correspondent node based on the candidate crossover router review of the refresh bits.

In addition, the method may include the mobile node completing a handover to a second access router among candidate access routers, the mobile node transmitting a binding update message to a crossover router establishing a path through the second access router among the candidate crossover routers, and the crossover router releasing the resource reservation established on the existing path by transmitting a resource release message teardown message to the first access router. The method may further include completing a handover to a second access router among candidate access routers in a state that a resource pre-reservation is not established, and the crossover router, which establishes a path through the second access router among the candidate crossover routers, establishing the localized resource reservation.

Refresh bits, of a header portion of the specified resource reservation message, may include a mobility bit setting a resource reservation between the crossover router and the second access router and a resource reservation refresh limit time. The crossover router establishing of the localized resource reservation may include a router positioned on a path between the candidate crossover router and the candidate access router maintaining a path state where information about an existing path is stored before the handover is terminated, the crossover router and the second access router exchanging a resource establishment message including a mobility bit, if the mobile node performs the handover to the second access router, and the crossover router establishing the localized resource reservation by recognizing the mobility bit.

The method may include the crossover router releasing existing resources established with the first access router if the localized resource reservation is established, refreshing a resource reservation state on the path including the second access router if the resource reservation state is held longer than the refresh time set by the mobility bit. The crossover router establishing of the localized resource reservation includes the crossover router establishing the path state by transmitting a path message in a direction of the mobile node if the crossover router is a sender in a receiver-initiated type resource reservation, the mobile node transmitting a binding update message to the second access router if the mobile node completes the handover to the second access router, the second access router transmitting the path message to the mobile node, the mobile node transmitting a reservation message corresponding to the path message through the second access router, and the crossover router establishing the localized resource reservation by transmitting a confirmation message corresponding to the reservation message to the second access router.

The crossover router establishing of the localized resource reservation may included a router positioned on a path between the crossover router and the second access router storing the information about the existing path in a sender-initiated type resource reservation, the second access router transmitting a reservation message, in which a mobility bit is set, to the crossover router if the handover is terminated and a binding update message is received, and the crossover router establishing the localized resource reservation by transmitting a confirmation message corresponding to the reservation message to the second access router.

To achieve the above and/or other aspects and advantages, embodiments of the present invention include a system for reserving resources in a mobile network, including a mobile node for performing communications with a correspondent node through a specified network, a first access router enabling the mobile node to access the specified network and searching for a candidate access router having a possibility of performing communication between the mobile node and the correspondent node if the mobile node were to move in a mobile node handover, and a candidate crossover router for establishing a localized resource reservation by exchanging a specified resource reservation message with the candidate access router before the mobile node's handover is terminated.

The resource reservation message may include a header portion that contains specified refresh bits containing time information for refreshing a resource pre-reservation. The candidate crossover router may establish a localized resource reservation only with the candidate access router, without transmitting the resource reservation message to an upper router in a direction of the correspondent node, if the resource reservation message is received and a resource pre-reservation is confirmed from the refresh bits.

If the mobile node completes the handover to a second access router among candidate access routers, a crossover router, which establishes a path through the second access router among the candidate crossover routers, releases resources established on an existing path by transmitting a resource release teardown message to the first access router. If the handover is terminated in a state that the resource pre-reservation is not established, the crossover router establishes a localized resource reservation with the second access router.

In addition, refresh bits, of the resource reservation message header portion, include a mobility bit that contains resource reservation refresh time information for refreshing the resource reservation between the crossover router and the second access router. If the second access router receives a binding update message from the mobile node in a state that a resource pre-reservation is not established, the second access router sets the mobility bit in the resource reservation message and transmits the resource reservation message to the crossover router. If the mobility bit is identified after the resource reservation message is received, the crossover router establishes a localized resource reservation only with the second access router without transmitting the resource reservation message to the upper router.

In a receiver-initiated type resource reservation, the crossover router, if it is a sender, establishes a localized resource reservation by establishing a path state by transmitting a path message in a direction of the mobile node, and transmitting a confirmation message corresponding to the reservation message to the mobile node if the reservation message is transmitted from the second access router after a handover is completed.

If a binding update message is transmitted from the mobile node in a state that the path state is established, the second access router immediately transmits the path message to the mobile node, and if the reservation message is received from the mobile node, the second access router transmits the reservation message to the crossover router. If the resource reservation is re-established, the crossover router releases existing resources on a path established between the crossover router and the first access router by transmitting a teardown message to the first access router.

In addition, in the sender-initiated type resource reservation, the second access router may transmit the reservation message, in which the mobility bit is set, to the crossover router, and the crossover router reestablishes a localized resource reservation by transmitting a confirmation message corresponding to the reservation message to the mobile node. If the resource reservation is re-established, the crossover router releases the existing resources on a path established between the crossover router and the first access router by transmitting a teardown message to the first access router.

To achieve the above and/or other aspects and advantages, embodiments of the present invention included a mobile network having a plurality of access routers for communicating between a mobile node and a correspondent node, through at least one of the plurality of access routers by implementing method embodiments of the present invention.

To achieve the above and/or still other aspects and advantages, embodiments of the present invention included a mobile network, having a plurality of access routers for communicating between a mobile node and a correspondent node, through at least one of the plurality of access routers, and a system of reserving resources in the mobile network, according to embodiments of the present invention.

Lastly, to achieve the above and/or other aspects and advantages, embodiments of the present invention include a medium having computer readable code implementing embodiments of the present invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
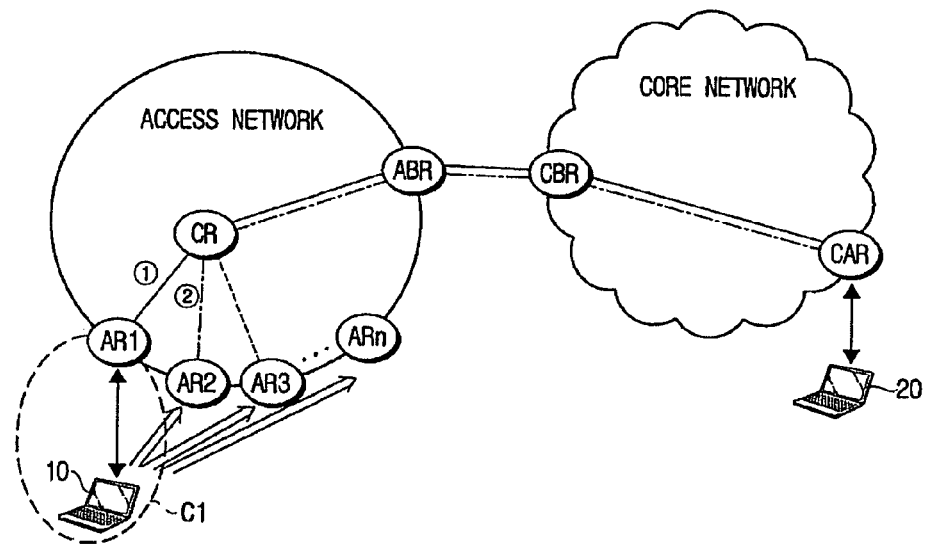
FIG. 1 illustrates paths for preemptively establishing resources, according to the conventional MRSVP.
Figure 2:
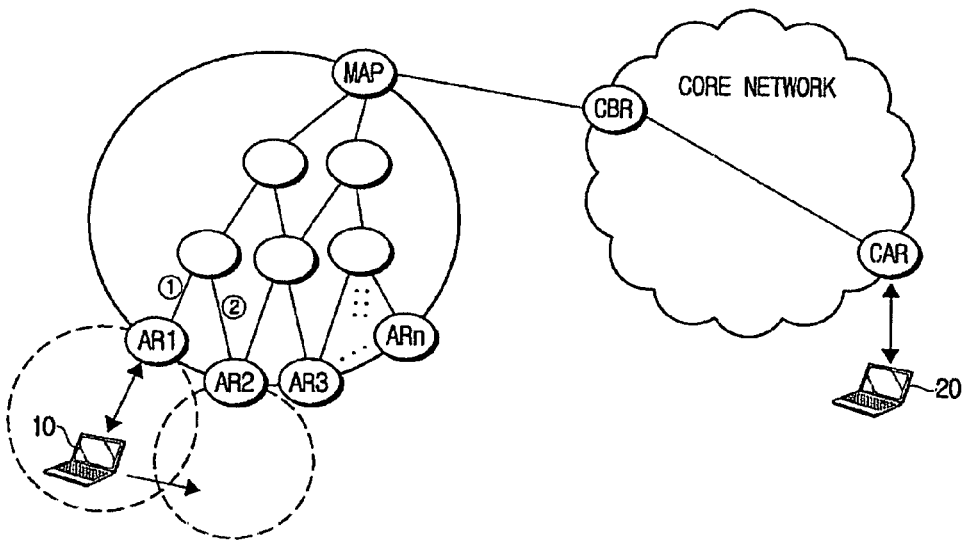
FIG. 2 illustrates paths for preemptively establishing new resources through an address changing method, according to the conventional RSVP-MP.
Figure 3:
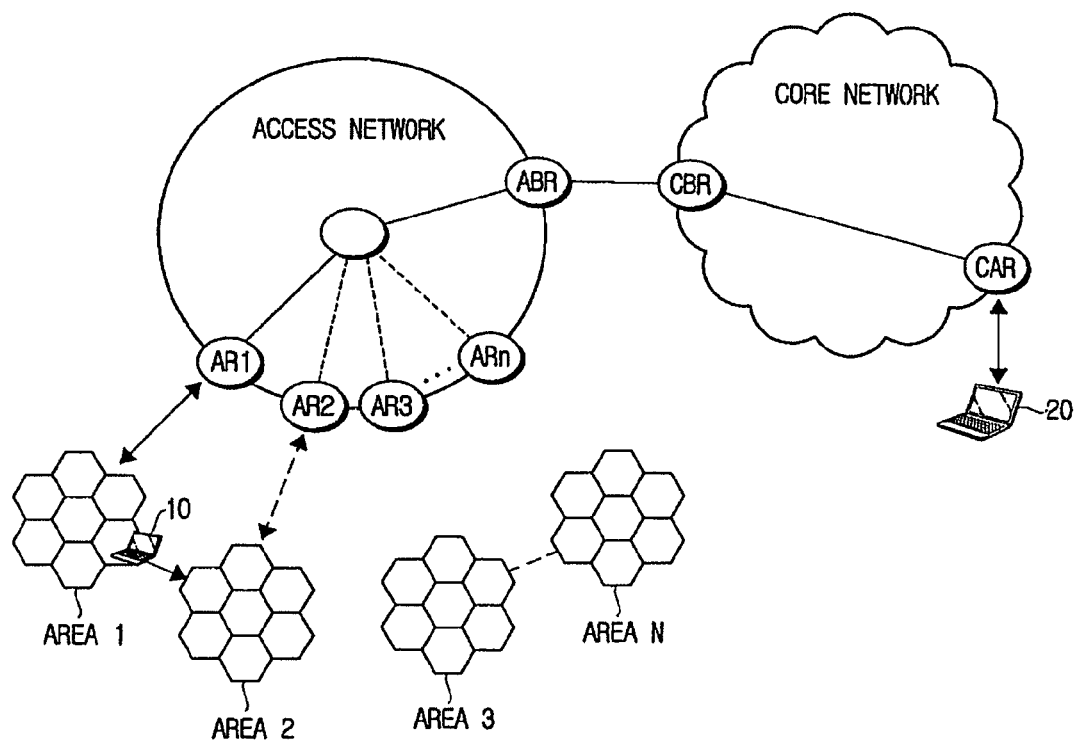
FIG. 3 illustrates a conventional CORP type RSVP path extending process, through a hierarchical reservation path and path extending process using an optimized reservation path.

Reference will now be made in detail to the embodiments of the present invention, examples of which are illustrated in the accompanying drawings, wherein like reference numerals refer to the like elements throughout. The embodiments are described below to explain the present invention by referring to the figures.

Accordingly, the matters defined below, such as a detailed construction and elements, are nothing but the examples provided to assist in a comprehensive understanding of the invention. Thus, it is apparent that embodiments of the present invention can be carried out without those defined matters. Also, well-known functions or constructions are not described in detail since they would obscure the invention in unnecessary detail.

Figure 4:
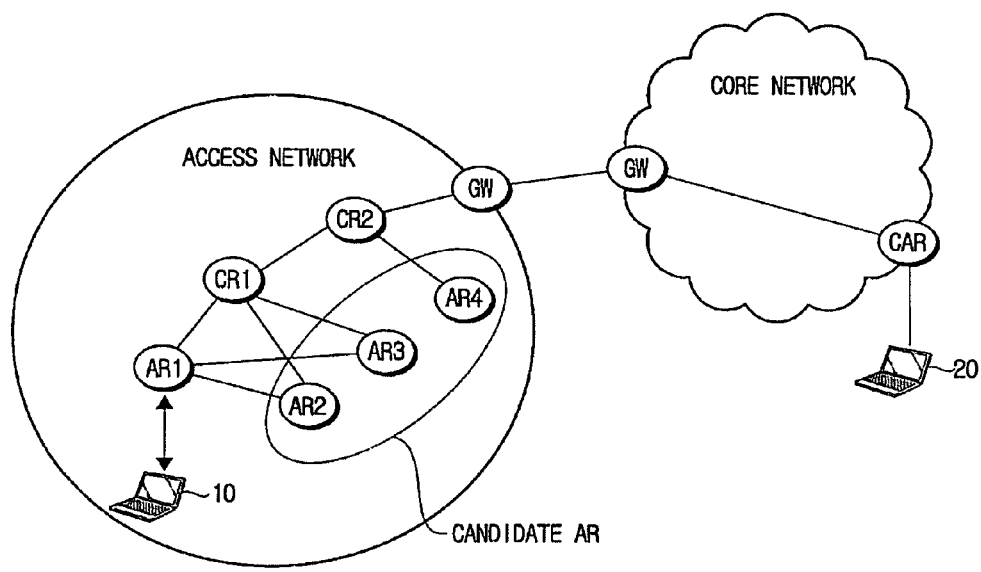
FIG. 4 illustrates a resource reservation process in a resource reservation system, according to an exemplary embodiment of the present invention.

FIG. 4 illustrates a wireless mobile network applying a resource reservation system, according to an exemplary embodiment of the present invention. Referring to FIG. 4, this resource reservation system includes a mobile node 10, an access router AR1 for enabling the mobile node 10 to access an access network, several candidate access routers AR2 to AR4, and several crossover routers CR1 and CR2. Accordingly, the mobile node accesses a core network through a gateway GW, and in the same manner, is connected to a correspondent node 20 connected to the core network using a correspondent access router.

In the resource reservation system, the mobile node 10 and the correspondent node 20 basically exchange signaling messages such as a path message, a reservation message, a confirmation message, a rejection message, a teardown message, and an error message, in order to reserve resources required for communications.

The path message is transmitted to a receiver from a sender in order to set a path state, and the reservation message is transmitted so as to reserve the resources in an opposite direction to a direction in which the path message is transmitted. The confirmation message is transmitted when the resource reservation has been successfully made, and the rejection message is transmitted when the resource reservation has not been successfully made. The teardown message is used to release currently reserved resources, and the error message is used to report all errors occurring during the resource reservation.

If an end-to-end resource reservation is made, a reserved session is basically divided into three types: a correspondent node-crossover router (CN-CR), a crossover router-access router (CR-AR), and an access router-mobile node (AR-MN). The CN-CR section refers to a common path or joined path where no signaling is changed, and the CR-AR section refers to a part where a localized session change is performed due to a handover of the mobile node 10.

According to an exemplary embodiment of the present invention, when performing the handover, the mobile node instructs a resource pre-reservation by searching a candidate access router to which the mobile terminal possibly will move and a candidate crossover router provided when the mobile terminal performs the handover to the candidate access router and then generating refresh bits utilizing a field that is not used in a header portion of the signaling message. If the handover is completed in a state that the resource pre-reservation is not made, the mobile terminal makes a resource re-reservation made promptly. The refresh bits are used as an identifier for localization of the resource reservation.

As shown in FIG. 4, if the mobile node 10 performs a handover from an area managed by AR1 to an area managed by another access router, it transmits a handover start message for informing AR1 of a handover start. The handover start message may include a mobility specification that contains mobility information of the mobile node and information on an adjacent access router. The mobile node 10 determines the handover start time point by checking whether the intensity of a signal transmitted from the present access router AR1 is lowered less than a threshold value, or whether the intensity of a signal transmitted through another access router is heightened more than a specified value. The mobile node may report the occurrence of the handover by setting an 'H' bit in a mobility object to '1' after defining the mobility object in the path message (when the mobile node is a sender) that is the resource reservation message for refreshing the resource reservation, or the reservation message (when the mobile node is a receiver).

If the access router AR1 recognizes the start of the handover through the handover start message or the refresh message, the access router AR1 finds at least one candidate access router AR2 to AR4 by searching routers of areas to which the mobile node 10 possibly could move, among the adjacent routers. In order to find the candidate access router, a CARD (Candidate Access Router Discovery) algorithm is used. A system (Draft-ieff-seamoby-card-protocol-04.txt) proposed by IETF Seamoby WG or other systems may be used.

If the candidate access router is found through the CARD algorithm, the old access router AR1 transmits session information (e.g., information such as path message information, reservation message information, and mobility specification information) stored in the access router itself to the appropriate candidate access routers AR2 to AR4. This session information includes a session ID, flow ID and mobility object that indicates the mobility of the mobile node 10.

If the candidate access routers AR2 to AR4 are searched, the respective candidate access routers search the corresponding crossover routers CR1 and CR2 using the session information. If the mobile node 10 performs a handover from the old access router to a new access router, the upper routers, positioned on paths in a direction of the correspondent node 20 in the old access router and the new access router, will become the crossover routers. A path is established through the new access router, and the reserved resources, which are not used in the respective routers on the established paths, are released for the old access router.

Accordingly, the crossover routers are changed depending on where the mobile node 10 moves. Specifically, the crossover routers may be changed according to the candidate access routers AR2 to AR4, and the crossover routers corresponding to the candidate access routers are then considered the candidate crossover routers. Referring to FIG. 4, the crossover router corresponding to AR2 and AR3, among the candidate access routers AR2 to AR4, becomes CR1, and the crossover router corresponding to AR4 becomes CR2. Accordingly, before the completion of the handover, CR1 and CR2 become the candidate crossover routers. If the mobile node 10 performs a handover to AR3 among the candidate access routers, CR1 becomes the crossover router.

The implementation of the above-described candidate crossover routers CR1 and CR2 solve the problem of the double resource reservation occurring when the end-to-end resource reservation is made and makes a prompt resource reservation possible. Specifically, if a handover of the mobile node 10 to one of the candidate access routers AR2 to AR4 occurs, a localized path change occurs only between the candidate access routers and the crossover routers through the crossover routers' identification of the refresh bits of the path message or reservation message, thereby preventing the double resource reservation by reserving resources for the routers on the path. By pre-reserving the paths through the candidate access routers and the candidate crossover routers, a prompt resource reservation becomes possible during the handover.

As shown in FIG. 4, in the case of the handover of the mobile node accessing AR1, the mobile node should release the path between AR1 and CR1, and search for a path through another access router. A merging point is provided at the point where the old path connecting through AR1 and the new path connecting through the present access router meet together. Generally, an upper router that serves as the merging point becomes the crossover router CR. The crossover router serves to reserve resources through the new path on which the handover occurred, and then promptly release resources set on the old path.

A set reservation session has an inherent session ID, and this session ID can be used to identify the session until the session is terminated. In other words, even if the handover occurs and the path is changed, the session ID of the reservation session does not change. A data flow that requires the resource reservation has one flow ID. This flow ID is constructed using an IP address of the mobile node 10, an IP address of the correspondent node 20, and a port number.

According to an exemplary embodiment of the present invention, a crossover router can be searched using the session ID, flow ID, IP logical interface (or logical interface number), and mobility object. The candidate access routers AR2 to AR4 transmit the path message or crossover router (CR) search message to the adjacent routers on the paths in the direction of the correspondent node 20. That is, if the mobile node 10 is the sender, the mobile node 10 transmits the path message, and thus the candidate access routers search the candidate crossover routers corresponding to the respective candidate access routers using the path message. If the correspondent node 20 is the sender, the candidate access routers separately transmit messages for searching the crossover routers. By setting the 'H' bit of the mobility object in the message to '1', the candidate access routers may indicate that the handover of the mobile node has occurred.

An adjacent router, which receives the message, determines whether the session ID of the currently reserved session is identical with the session ID of the received path message or the CR search message by comparing them with each other. If they are not identical with each other, the adjacent router determines that the session is not reserved in the router, and retransmits the received message to the adjacent router in the direction of the correspondent node 20.

If it is determined that the session IDs are identical with each other, the adjacent router confirms the logical interface number of the IP logical interface through which the path message or CR message is received. If it is confirmed that the same session ID is input through the different incoming interfaces or logical interface numbers, the adjacent router recognizes itself as the candidate crossover router.

Figure 5:
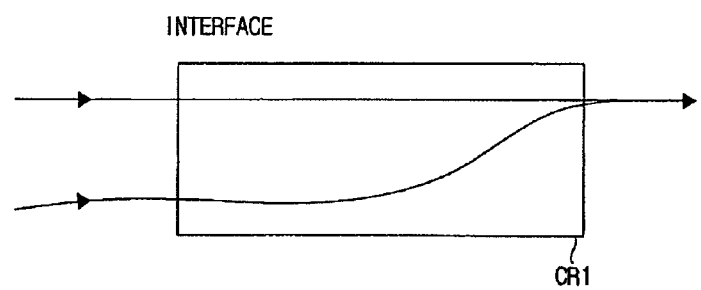
FIG. 5 illustrates a process of releasing the existing resource when a resource reservation of a new path is performed in the resource reservation system, according to an exemplary embodiment of the present invention.

FIG. 5 illustrates a router that receives messages from two different routers. As shown in FIG. 5, the messages received from the respective routers are input through different logical interfaces (or different logical interface numbers), and thus have different IP logical interface numbers. Accordingly, if the session IDs included in the respective messages are identical with each other, the corresponding router may generally be considered the crossover router.

In FIG. 5, if the messages having the identical session ID are received through different logical interfaces, that is, if the router is the router CR1 positioned at the merging point of the path formed through the new access router AR3 and the path formed through the old access router AR1, the router CR1 may generally be the crossover router. However, if the corresponding router cannot support the RSVP and specified resource reservation system, it cannot be used as the candidate crossover router.

The router CR1 positioned at the merging point transmits the session information in the direction of the correspondent node 20, and the adjacent router CR2 that has received the session information determines whether the router CR2 itself is the crossover router. Since the crossover router CR2 is positioned on the joined path, its IP logical interface number becomes identical with that of the router CR1. Accordingly, the method as illustrated in FIG. 5 cannot recognize the crossover router. The flow IDs are compared with each other in order to confirm whether they are identical with each other. This is because a different flow ID is used when the access router is changed due to the handover. Also, the crossover router may be identified using the logical interface number. It is required for the respective nodes to recognize their logical interface numbers.

If it is confirmed that the flow ID has changed, the router confirms the mobility object of the message. That is, if the 'H' bit of the mobility object is set to '1', the router confirms the occurrence of the handover of the mobile node, for which the resource reservation has been made. Accordingly, the upper router CR1 or CR2 determines itself to be the crossover router, and performs a prompt resource re-reservation and release of the existing resources. If the mobile node 10 is the sender, the upper router CR1 or CR2 transfers the received path message to the upper router existing in the direction of the correspondent node on the common path to update the resource reservation state. By resetting the 'H' bit of the mobility object of the path message to '0', the upper router prevents the mis-recognition of itself as the crossover router. Whether or not a crossover router has been found, may be indicated without using the 'H' bit. In this case, a separate flag bit is used. In other words, the 'H' bit may be used only for indicating a start of a handover, and the separate flag bit may be separately provided to indicate whether the crossover router has been found or not. Since the mobile node 10, which is the receiver, transmits the CR search message, it does not transmit the CR search message to the upper router any more if the crossover router is determined. The mobility object may include a mobility event counter bit. This bit is helpful to the resource reservation signaling system when a macro mobility or ping-pong type handover occurs. Specifically, this bit enables the mobile node 10 to count the number of handover occurrences so that the mobile node can confirm the final resource reservation message. For example, if a handover of the mobile node 10 to AR3 occurs before the resource reservation for AR2 and the resource release for AR1 due to the prompt movement of mobile node 10, which accesses the access network through AR1 shown in FIG. 4 and moves to AR2 and then to AR3, the crossover router senses the number of handover occurrences by confirming the mobility event counter bit of the mobility object, and thus can disregard the resource reservation message produced during the previous handover.

Although the crossover router can be searched, as described above, the crossover router should be re-searched when the crossover router fails immediately after it is found, and thus the resource re-reservation and the release of the existing resources cannot be performed. It is necessary to confirm whether the present crossover router is dead or alive. This process is called a DPD (Dead Peer Discovery).

According to DPD, if a router transmits a PD (Peer Discovery) search message to an adjacent router (that is, peer router) on the signaling path and receives a confirmation message to the PD search message, the state of the router that takes part in the reservation session of a specified flow can be confirmed. The node that transmits the PD search message is called a PD requester, and the node that transmits the confirmation message is called a PD responder. The old router of the crossover router, which was determined to be the crossover router but cannot perform the crossover function due to the router failure, transmits the PD search message to the crossover router of an adjacent node. If no confirmation message is received within a predetermined time, it is considered that the crossover router is in a dead state, and a new path is formed by the routing protocol, and then a peer router is searched for on the path. If a new peer router is found, the new peer router performs the prompt resource reservation and the release of the existing resources by re-searching the crossover router as described above.

The crossover router may include a cookie in the PD confirmation message for security and transfers the PD response message including the cookie to the PD requester. The PD requester confirms whether the PD response message is effective by checking the cookie in the PD response message.

If the failure occurs after the crossover router has been found, and the resource reservation and the release of the existing resources has been performed, an old hop router, which exists on the new signaling path, becomes the PD requester and performs the DPD process to search for the new peer router. Since the resource reservation on the old path has already been released and the new resource reservation has normally been made on the new path, it is not required to re-search the crossover router.

If the candidate crossover routers CR1 and CR2, corresponding to the respective candidate access routers AR2 to AR4, are determined in the above-described manner, the localized resource reservation is made between the respective access routers and the candidate crossover routers before the handover is terminated. If the handover is terminated in a state where the resource reservation has not been made, the localized resource reservation is promptly made.

In order to make a resource reservation, the router which has recognized itself as the candidate crossover router should inform the mobile node 10 that the crossover router has been found. If the mobile node 10 is the sender, the candidate crossover router may report the discovery of the crossover router to the mobile node 10 by transmitting a CR-found packet, having a small size, to the mobile node 10. If the mobile node 10 is the receiver, the correspondent node 20 may report the discovery of the crossover router to the mobile node 10 by adjusting a specified bit value of the transmitted path message.

If the mobile node 10 recognizes the discovery of the crossover routers, corresponding to the respective candidate access routers AR2 to AR4, the mobile node 10 takes part in the resource reservation process. Specifically, if the handover is in process, the mobile node 10 pre-reserves resources between the respective candidate access routers and the respective candidate crossover routers, and if the handover is completed in a state where the resource pre-reservation has not been made, the mobile node 10 transmits the path message or reservation message so as to promptly re-reserve the resources. The resource reservation is classified into a receiver-initiated resource reservation and a sender-initiated resource reservation depending on which part starts the resource reservation. The receiver-initiated resource reservation is for the receiver to attempt to reserve the reservation. According to the receiver-initiated resource reservation, the resource reservation is made in a manner that the sender transmits the path message to the receiver, the receiver transmits the corresponding reservation message to the sender, and then the sender transmits an acknowledgement (ACK) message, for confirming the receipt of the reservation message, to the receiver. The ACK message is optional. By contrast, according to the sender-initiated resource reservation, the resource reservation is made in a manner that the sender transmits the reservation message to the receiver, and the receiver transmits the ACK message for confirming the receipt of the reservation message to the sender.

According to an exemplary embodiment of the present invention, by setting specified refresh bits using a field that is not used among a header part of the path message or reservation message, the localized resource reservation can be attempted.

Specifically, if the mobile node 1 is the sender, the refresh bits are provided on the header part of the resource reservation message irrespective of the resource reservation type. For example, the path message may be used in the receiver-initiated resource reservation, and the reservation message may be used in the sender-initiated resource reservation.

The refresh bits are provided on a flag field or reserved field part that is not in use in the header. The refresh bits are composed of a pre-reservation bit (hereinafter, referred to as the 'P' bit) for reporting the pre-reservation of resources, or a mobility bit (hereinafter, referred to as the 'M' bit) for reporting the completion of movement.

Figure 6:
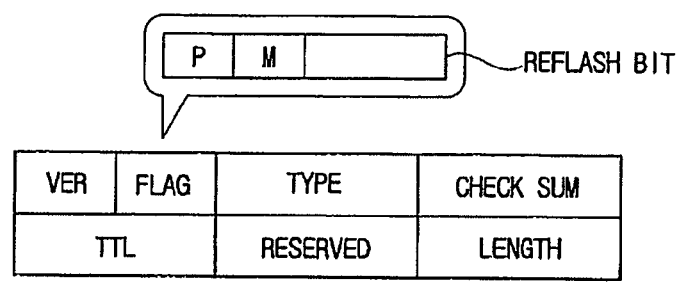
FIG. 6 illustrates an upper router's process of recognizing itself as a crossover router in the resource reservation system, according to an exemplary embodiment of the present invention.

FIG. 6 illustrates refresh bits included in a header part of a resource reservation message. Referring to FIG. 6, in the flag field of the header, the 'P' bit and 'M' bit are set, with the 'P' bit and 'M' bit having a specified bit size. 'P' bit refers to a part of the header that contains information on an instruction to pre-reserve resources and a reservation limit time for refreshing a state of the pre-reservation of resources, and 'M' bit refers to a part of the header for setting an instruction to re-reserve resources by recognizing the termination of the handover and a refresh time value of the access network that is smaller than a refresh time value of the core network. The 'M' bit part is set for a prompt re-reservation of resources if the pre-reservation of resources fails, which will be explained below.

If the candidate access routers AR2 to AR4 receive the path message or the reservation message from the present access router AR1, they set the 'P' bit value among the refresh bits of the header part to '1'. The candidate crossover routers CR1 and CR2, found corresponding to the candidate access routers AR2 to AR4, confirm the header part of the messages received from the candidate access routers AR2 to AR4. If the 'P' bit value is '1', they recognize it as a localized pre-reservation instruction, that is, an instruction to reserve only resources between the crossover routers and the candidate access routers, before the completion of the handover, and pre-reserve the corresponding resources.

If the mobile node 10 is the sender, in following the receiver-initiated resource reservation, the mobile node 10 transmits the path message to the respective candidate crossover routers CR1 and CR2, through the searched candidate access routers AR2 to AR4. The respective candidate crossover routers CR1 and CR2 confirm the 'P' bit of the header part of the path message. If the 'P' bit is set to '1', they recognize this as a resource pre-reservation instruction, and establish the localized resource reservation paths with the respective candidate access routers AR2 to AR4.

If the mobile node 10 is the sender, in following the sender-initiated resource reservation, the mobile node 10 transmits the reservation message to the respective candidate crossover routers CR1 and CR2, through the candidate access routers Ar2 to AR4. The respective candidate crossover routers CR1 and CR2 confirm a resource pre-reservation instruction from the refresh bits included in the header part of the reservation message, and make the localized resource reservation with the respective candidate access routers AR2 to AR4.

Accordingly, irrespective of the receiver-initiated or sender-initiated resource reservation, paths are pre-reserved through the respective candidate access routers AR2 to AR4, to which the mobile node 10 possibly performs a handover with, and thus QoS can be secured even if the mobile node performs the handover to any access router.

If the mobile node 10 performs the handover to AR3, among the candidate access routers AR2 to AR4, AR3 becomes the new access router NAR and CR1 becomes the crossover router. Accordingly, the mobile node 10 performs communications with the correspondent node 20 using the path established through AR2. Thus, it is not required for other candidate access routers AR2 and AR4 to continuously keep the resource reservation state. Accordingly, in the 'P' bit, a specified refresh time value, that is, a reservation limit time value optimized to match the handover situation, is set. If the pre-reservation state is kept over the reservation limit time, the corresponding resources are refreshed to reduce the unnecessary waste of resources. Specifically, if the resource pre-reservation state is kept over the refresh time, the resource reservation is re-performed by refreshing the resource reservation state.

If the crossover router receives a binding update message after the completion of the handover, the crossover router immediately releases the existing resources, which are not in use and established in the old access router, by transmitting a teardown message to the old access router.

However, if the resource pre-reservation fails due to an absence of useful resources that can be supported by the RSVP router or due to the failure of the RSVP router, the candidate sender nodes continuously attempt the resource pre-reservation until they receive the binding update message (hereinafter, refer to as 'BU message') from the mobile node. In the mobile IPv4/v6 environment, the mobile node 10 has a CoA (Care of Address) that is recorded in a home agent or the correspondent node and reports the present position of the mobile node 10, and the CoA should be updated whenever the mobile node changes its position. By transmitting the BU message, the mobile node can keep the connection with the correspondent node 20 or the home agent. That is, if the handover of the mobile node 10 is completed, the mobile node 10 transmits the BU message containing the present position information to the candidate sender nodes.

The candidate sender nodes may be the candidate crossover routers, candidate access routers, or routers between the candidate crossover routers and the candidate access routers. These candidate sender nodes search the nodes and routers that have useful resources until the BU message is transmitted from the mobile node. However, if the BU message is received in a state that the resource pre-reservation has not been finally established, the candidate sender nodes attempt a prompt re-reservation of resources. In attempting the re-reservation, there is a difference between the receiver-initiated resource reservation and the sender-initiated resource reservation.

According to the receiver-initiated resource reservation, if the sender recognizes the failure of the resource pre-reservation, the sender attempts establishment of a path state. If the crossover router CR1 is the sender, CR1 establishes the path state by sending the path message to the new access router NAR. This can be achieved through the RSVP routers' recognition of the 'P' bit being set in the refresh bits. Since the new access router NAR recognizes the 'P' bit, the new access router NAR keeps the path state without transmitting an error message (that is, a message for notifying that the NAR cannot continue to transfer the path message to the final node) to the crossover router CR1 even the new access router NAR cannot transmit the path message to the mobile node 10 until it receives the BU message. The path state denotes the state where respective routers on the new path, through the new access router NAR, store the session information about the existing path. Accordingly, if the BU message is received from the mobile node 10, after the path state is established, the NAR transmits the path message to the mobile node 10, and thus a prompt resource reservation becomes possible.

If the path message is received, the mobile node 10 transmits the reservation message to the NAR. The NAR sets the 'M' bit among the refresh bits included in the header part of the reservation message. The crossover router CR1 establishes the localized path with the mobile node 10, without transmitting the reservation message to the next RSVP router, by recognizing the 'M' bit. Accordingly, the waste of resources can be prevented, and prompt resource re-establishment becomes possible. FIG. 6 illustrates the header part of the message that includes the 'M' bit. Referring to FIG. 6, the resource pre-reservation is instructed by setting the 'P' bit when the handover is in progress, and a prompt resource re-reservation is instructed by setting the 'M' bit when the handover is completed. The refresh time value of the access network may be set to a value that is smaller than the refresh time value of the core network using the 'M' bit. Since the reserved resources are refreshed if the resource reservation state is maintained over the refresh time value, the refresh can be performed more frequently, compared to when the refresh is performed utilizing the refresh time value of the core network, and thus the unnecessary waste of resources can be prevented.

In the sender-initiated reservation, the candidate nodes (that is, nodes of the candidate access routers and the candidate crossover routers) can store the state information for resource reservation by identifying the 'P' bit of the reservation message received from the mobile node 10 during the process of attempting the resource pre-reservation. If the handover is completed, the mobile node 10 transmits the reservation message, where the 'P' bit is set instead of the 'M' bit, to the crossover router CR1 through the new access router NAR. The crossover router reports a 'resource reservation success' by transmitting the confirmation message to the access router without transmitting the reservation message to the next RSVP router, by identifying the 'M' bit. The crossover router confirms the previously stored resource reservation information, and thus a prompt resource reservation can be made.

If the resource reservation succeeds through the receiver-initiated or sender-initiated resource reservation, the crossover router CR1 attempts the teardown of the existing resources established in the old access router AR1.

Figure 7:
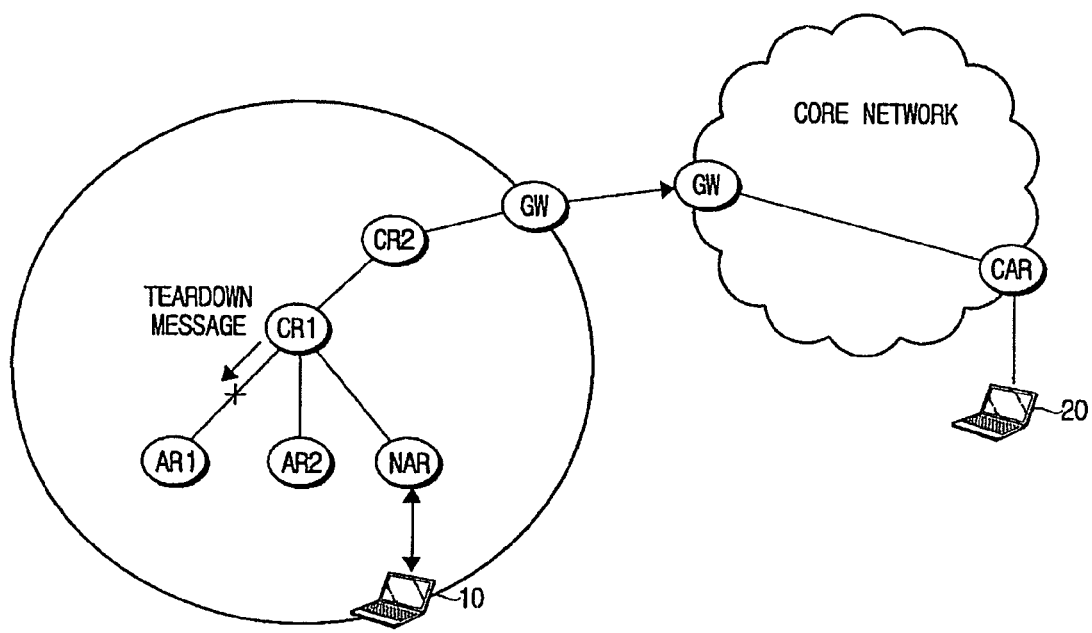
FIG. 7 illustrates a header structure of a resource reservation message for performing a resource pre-reservation and re-reservation in a resource reservation system, according to an exemplary embodiment of the present invention.

FIG. 7 illustrates a process of releasing the existing resources. Referring to FIG. 7, the crossover router CR1 immediately releases resources that are not in use by transmitting a teardown message to the old access router AR1.

Figure 8:
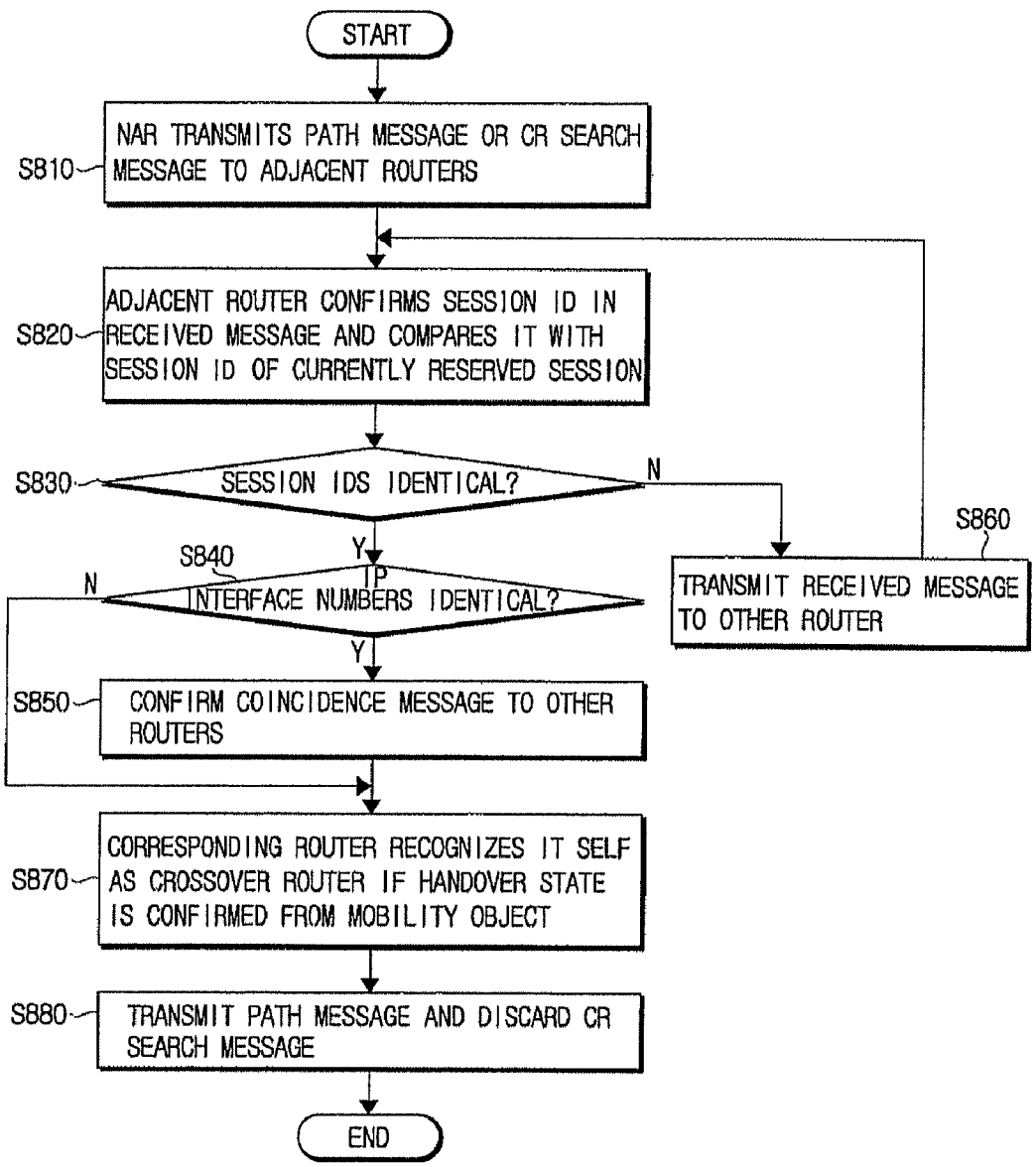
FIG. 8 illustrates a flowchart of a crossover router searching method, according to an exemplary embodiment of the present invention.

FIG. 8 is a flowchart of a method for searching a crossover router if a handover of a mobile node 10 occurs in an access network, according to an exemplary embodiment of the present invention. Referring to FIG. 8, if the mobile node 10 performs a handover from the old access router OAR to a new access router NAR, the new access router NAR transmits the path message (when the mobile node is the receiver) or a crossover router (CR) search message (when the mobile node is the sender) to a router positioned in an upper direction on a new path, in operation S810.

This message includes a session ID, a flow ID and a mobility object. The upper router, which has received the message, confirms the session ID in the message, and determines whether the session ID in the message coincides with the previously reserved session ID by comparing the session Ids, in operation S820. If the session IDs do not coincide with each other, in operation S830, the upper router determines that the session has not been reserved in the present router and transmits the path message or the CR search message to a new upper router or an adjacent router on the path in the direction of the correspondent node 20, in operation S860.

In order to simply the search for the crossover router, the upper router can search for the crossover router by comparing the IP logical interface number of the router which receives the message with the IP logical interface number already stored in the router when the session IDs are identical with each other, in operation S840. Specifically, if the crossover router is positioned at a merging point of the old path and the new path, the input logical interfaces of the messages received through the paths become different, and thus the crossover router can simply be recognized by confirming the IP logical interface number. If the IP logical interface numbers are different, the router confirms whether the handover, has been re-performed through the confirming of the mobility object, in operation S870.

If the router positioned at the merging point cannot support the RSVP function, the corresponding router transmits the message to another upper router. The corresponding routers are positioned on the common path, and thus have the same IP logical interface number. Accordingly, the upper router positioned on the common path recognizes the crossover router by confirming the flow ID of the received message. Specifically, if it is determined that the corresponding routers have the same IP logical interface number, in operation S840, the upper router confirms whether the existing flow ID is the same as the presently received flow ID, in operation S850. If the flow IDs are also the same, the upper router confirms the mobility of the mobile terminal by confirming the mobility object, in operation S860.

If the IP logical interface numbers or the flow IDs are different, the corresponding router confirms whether the 'H' bit of the mobility object in the path message or the CR search message are set to '1', in operation S870. The confirmation of the 'H' bit of the mobility object is optional. If it is set to '1', this represents that a handover has occurred, and thus the corresponding router confirms that it is the crossover router. If the corresponding router cannot support the RSVP function, even though the IP logical interface numbers or the flow IDs are different, the corresponding router cannot perform the function of a crossover router, and thus re-searches for a crossover router among upper routers.

If the crossover router fails, just after the search, another crossover router should be re-searched by performing the above-described DPD process. If the crossover router fails after the resource re-reservation or the release of the existing resources is performed, the failure represents that the handover has already been terminated, and it is not required to re-search the crossover router. The corresponding router can confirm whether the received message is an effective message by transmitting a search message that includes the cookie.

By searching for the crossover router CR, as described above, the new access router NAR and the resources can promptly be re-reserved through the crossover router CR, and resources established with the old access router are immediately released.

The crossover router CR upgrades the resource reservation state by transmitting the path message, which has been transmitted to the crossover router, to an upper router in the direction of the correspondent node 20, and discards the CR search message, in operation S880. By setting the 'H' bit of the mobility object in the path message to '0', the upper router is prevented from recognizing itself as the crossover router.

Figure 9:
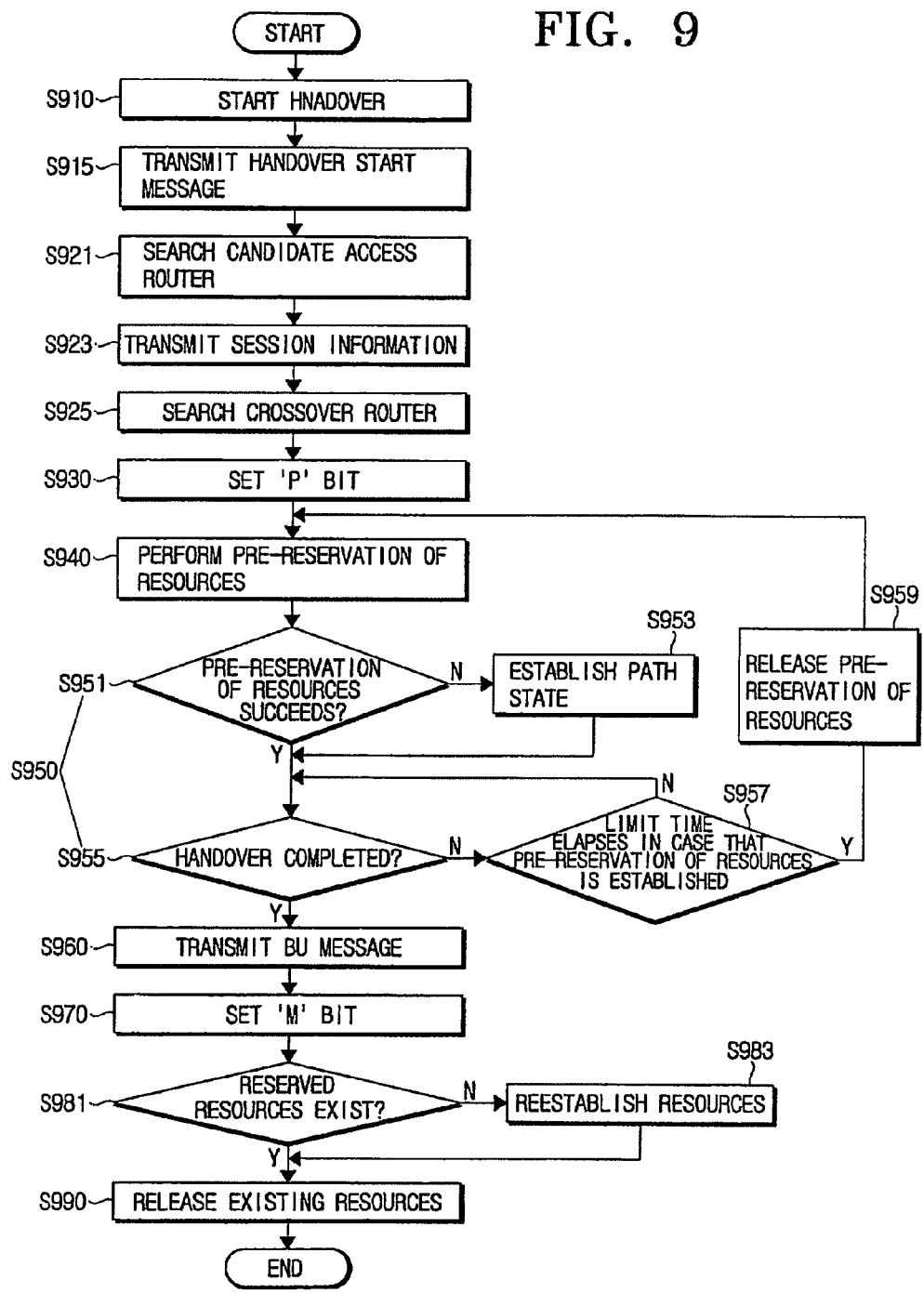
FIG. 9 illustrates a flowchart of a method of performing a resource pre-reservation and re-reservation, according to an exemplary embodiment of the present invention.

FIG. 9 is a flowchart of the pre-reservation and re-reservation of resources in a resource reservation system of a mobile network, according to an exemplary embodiment of the present invention. Referring to FIG. 9, if the handover of the mobile node 10 starts, in operation S910, the mobile node 10 transmits a handover start message for informing the old access router OAR of the handover, in operation S915. As shown in FIG. 4, AR1 becomes the old access router OAR. As described above, the handover start message may include a mobility specification that contains mobility information of the mobile node and information about adjacent access routers. The mobile node 10 may report the occurrence of the handover by setting the 'H' bit in the path message or the reservation message to '1' without separately transmitting the handover start message.

If the old access router recognizes the start of the mobile node's handover, the old access router searches the candidate access routers using the session information included in the received message, in operation S921. The old access router OAR can search access routers in an area, where the mobile node may possibly move, using a CARD algorithm for searching the candidate access routers. As illustrated in FIG. 4, AR2 to AR4 may be the candidate access routers.

If the candidate access routers are searched, the old access router OAR transmits the session information to the respective candidate access routers, in operation S923. This session information may be included in the path message or in the reservation message for refreshing the resource reservation established on the existing path, and transmitted to the candidate access routers.

The candidate access router CAR, which has received the session information, searches for a crossover router, that is, a candidate crossover router, among routers positioned on the path in the direction of the correspondent node 20 using the session ID, flow ID and mobility object included in the information, in operation S925. The method for searching the candidate crossover routers, according to an embodiment of the present invention is illustrated in FIG. 8. Specifically, the candidate access router transmits the path message or the CR message to the upper router in the direction of the correspondent node 20, and the upper router recognizes whether itself will be considered the crossover router by confirming the session ID, flow ID and mobility object in the message. The upper router may recognize whether itself will be considered the crossover router by confirming the logical interface number.

If the crossover router is searched for, as described above, the candidate access router instructs the crossover router to perform the resource pre-reservation before the handover is terminated by setting the refresh bits in the header part of the path message (that the mobile node is the sender) or the reservation message (when the mobile node is the receiver). In the description, a message related to the resource reservation, such as the path message or the reservation message, is called a resource reservation message.

As shown in FIG. 6, the refresh bits can include the 'P' bit and the 'M' bit. If the candidate access router sets the 'P' bit value to '1' and transmits the bit value to the candidate crossover router, the candidate crossover router recognizes this as the localized pre-reservation instruction, in operation S930.

Accordingly, by changing the path message and the reservation message (for the receiver-initiated resource reservation) or by changing the reservation message and the confirmation message (for the sender-initiated resource reservation), the candidate crossover router performs the pre-reservation work, in operation S940. If the candidate crossover router confirms that the 'P' bit value of the refresh bits, included in the resource reservation message, is '1', the candidate crossover router ceases to transmit the received resource reservation message to the router in the direction of the correspondent node 20. Accordingly, the localized pre-reservation can be performed.

The above-described pre-reservation work is continuously performed before the handover is terminated, in operation S950. If the pre-reservation is not performed until the handover is terminated, in operation S951, the candidate access router establishes the path state for a prompt re-reservation of resources, in operation S953. The path state represents the state of whether, if the binding update message of the mobile node is received, the path message can be immediately transmitted. For example, if the crossover router is the sender in the receiver-initiated resource reservation, the crossover router establishes the path state by sending the path message to the candidate access router (that is, a new access router). This can be performed through the RSVP routers' identification of the 'P' bit set in the refresh bits. Specifically, the candidate access router recognizes the 'P' bit, and thus keeps the path state without transmitting an error message (that is, a message indicating that the NAR cannot continue to transfer the path message to the final node) to the crossover router CR1 even if it cannot transmit the path message to the mobile node 10 until it receives the BU message.

If the handover is kept for more than a predetermined time after the resource pre-reservation has been successfully performed, the continuous maintaining of this resource pre-reservation state may cause resources to be wasted. In order to prevent this, a refresh time value, that is, a reservation limit time, is additionally set using the 'P' bit, and the resource reservation state may be refreshed if the established resource reservation state is kept over the reservation limit time.

Specifically, the router determines whether the handover has been completed, in operation S955, in a state where the resource pre-reservation has succeeded or the path state has been established. Then, the router determines whether the resource pre-reservation state is continuously maintained over the reservation limit time set by the 'P' bit, in operation S957, before the handover is completed. If it is determined that the resource pre-reservation state ha been maintained over the reservation limit time, the router re-performs the resource reservation work by refreshing the present state, in operation S959. As described above, the reservation limit time can be set to an optimized value according to the mobility of the mobile node using the 'P' bit of the refresh bits. The candidate crossover router recognizes the 'P' bit, and locally reserves resources only between the candidate crossover router and the candidate access router.

If the handover is completed, the mobile node transmits the binding update message to a new access router, in operation S960. As described above, the binding update message represents a message by which the mobile node informs a home agent HA and the correspondent node CN of its own CoA. Through the binding update message, the candidate access router recognizes the completion of the handover by confirming the change of CoA.

The candidate access router, which has received the BU message, sets the 'M' bit instead of the 'P' bit, in operation S970. If the resource pre-reservation is not performed, a prompt resource re-reservation should be made, and thus the candidate access router reports the completion of the handover to the candidate crossover router through the 'M' bit when the resource pre-reservation is not performed. According to the setting state of the 'M' bit, the candidate crossover router determines whether the resource pre-reservation has succeeded, in operation S981. If it successful, the candidate crossover router immediately releases resources established in the existing access router, in operation S990.

If the pre-reservation fails, the resource reservation between the new access router and the new crossover router is promptly established, in operation S983. Specifically, in the receiver-initiated resource reservation, the new access router transmits the path message to the mobile node 10, and the mobile node transmits the corresponding reservation message to the new crossover router through the new access router. The crossover router receives this, and reestablishes resources between the new crossover router and the new access router, without continuing to transmit the resource establishment instruction to the other routers, by recognizing the 'M' bit.

If resources are reestablished, the crossover router releases resources established in the existing access router in the same manner as when the pre-reservation is made in operation S990. That is, by transmitting a teardown message to the existing access router, the crossover router releases the resource establishment.

In the sender-initiated resource reservation, the resources are re-reserved by exchanging the reservation message and the confirmation message. Even in the resource re-reservation as described above, the resource reservation is established only between the candidate crossover router and the candidate access router by recognizing the 'M' bit. A prompt refresh may be made by setting the refresh time value of the access network smaller than the refresh time value of the core network.

Figure 10:
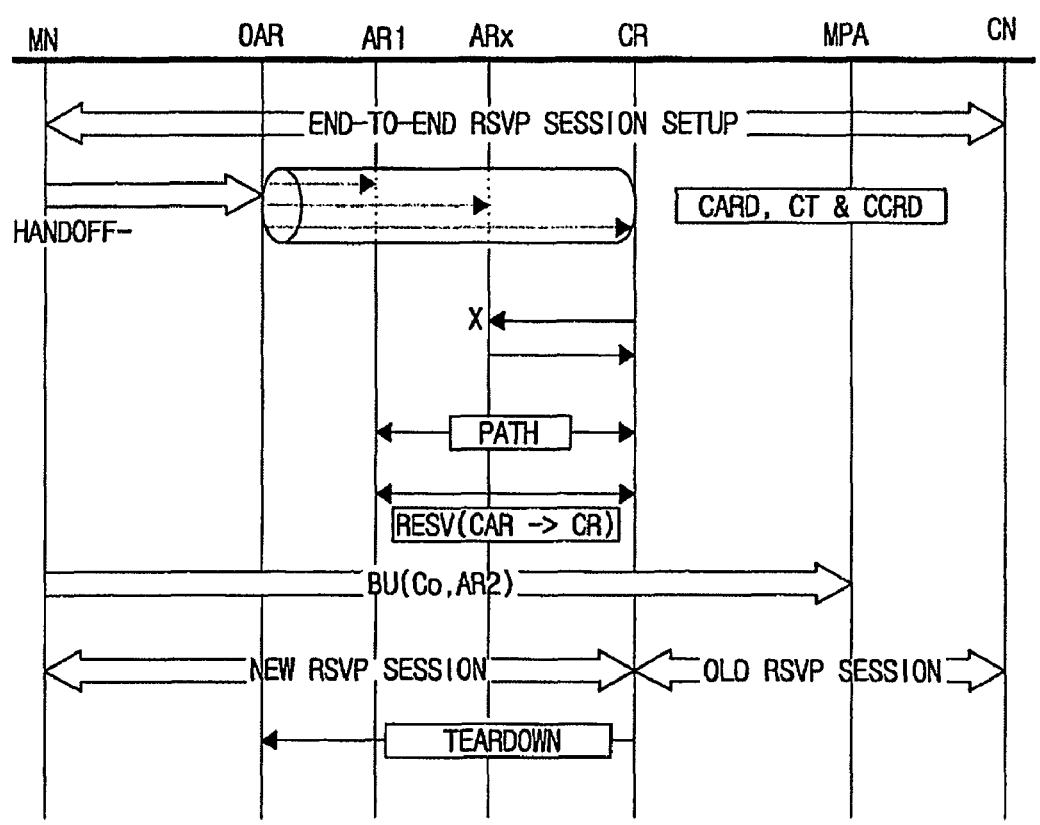
FIG. 10 illustrates a QoS signaling operation for a resource pre-reservation during a handover in the resource reservation system, according to an exemplary embodiment of the present invention.
Figure 11:
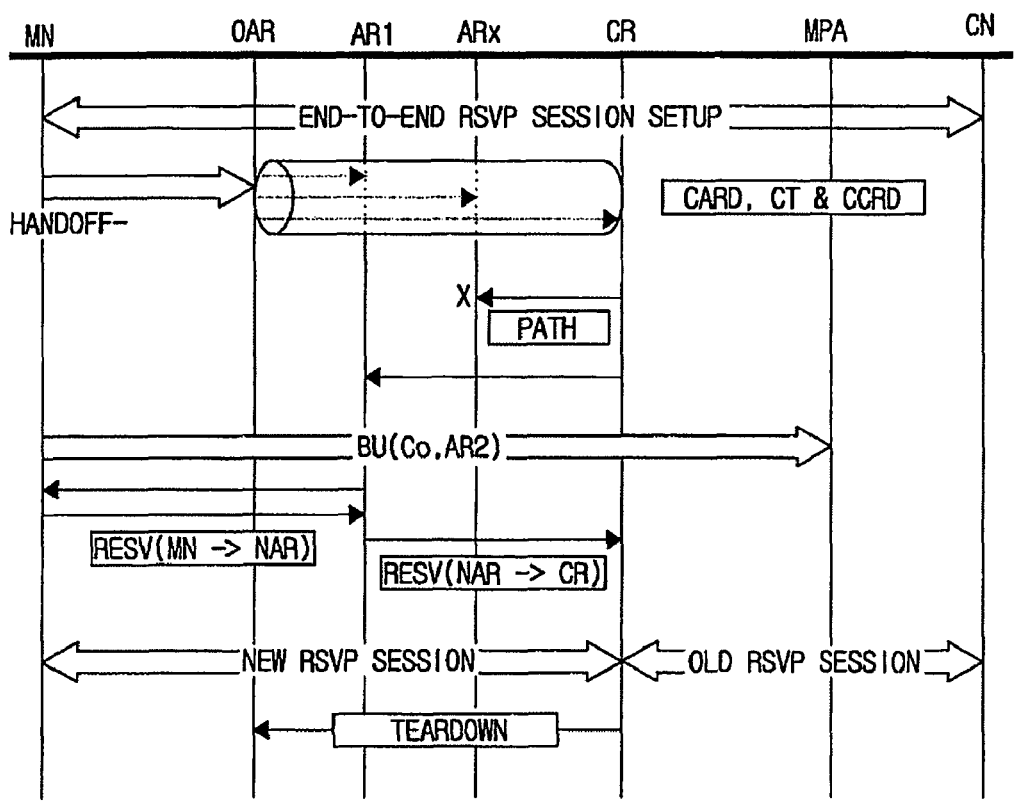
FIG. 11 illustrates a QoS signaling operation for a resource re-reservation, when the resource pre-reservation is not made during a handover in the resource reservation system, according to an exemplary embodiment of the present invention.

FIGS. 10 and 11 illustrate processes of performing the resource pre-reservation and re-reservation, according to an exemplary embodiment of the present invention.

FIG. 10 illustrates a QoS signaling operation for a resource pre-reservation when a mobile node performs a handover in the resource reservation system, according to an exemplary embodiment of the present invention. Referring to FIG. 10, if the handover of the mobile node MN starts, the handover start message is transmitted to the old access router OAR. If the OAR receives the handover start message, a candidate access router search (CARD), a context transfer (CT), and a candidate crossover router search (CCRD) are performed. The candidate crossover routers can be searched according to the flowchart of FIG. 8.

If the path message and the reservation message are exchanged between the searched candidate crossover routers and candidate crossover routers, the resource pre-reservation is made, a new RSVP session is established between the mobile node MN and the new crossover router, and the existing RSVP session is kept as it is between MAP and the communication correspondent node CN in the new crossover router.

If the resource pre-reservation is performed, the crossover router releases the resource establishment by transmitting a teardown message to the existing access router OAR.

FIG. 11 illustrates a QoS signaling operation for a resource re-reservation when the resource pre-reservation fails. If the resource pre-reservation fails, the candidate access router keeps the path state without transmitting the received path message to the mobile node MN. If the handover is completed and the BU is transmitted, the candidate access router becomes a new access router and transmits the path message to the mobile node MN. The mobile node transmits the resource reservation message to the candidate crossover router through the candidate access router. Accordingly, a new RSVP session is established between the mobile node MN and the new crossover router, and the existing RSVP session is kept as it is between MAP and the communication correspondent node CN in the new crossover router. As described above, this process is performed using the 'P' bit and the 'M' bit included in the refresh bits.

As described above, according to an exemplary embodiment of the present invention, a new RSVP path can be established in the access network without establishing the end-to-end RSVP path, and thus the load of intermediate routers in the core network can be reduced. Also, by securing the resources through a pre-reservation and a prompt re-reservation, deterioration of QoS during a handoff operation can be reduced with a QoS setup delay also reduced.

Although the resources are pre-reserved, excessive resource reservations can be prevented by properly adjusting a refresh time value, and a blocking probability, due to a double reservation of resources, can be reduced by promptly releasing existing resources. The system, according to an exemplary embodiment of the present invention, can especially operate without requiring the addition of a proxy, and use an existing system without great modification since it uses fields that are not used in the existing resource reservation message. Also, the present invention can be applied to both the receiver-initiated resource reservation and the sender-initiated resource reservation. For a prompt resource reservation, the present invention also provides a crossover router searching method. Accordingly, duplication of resources can be prevented through the establishment of a localized path with a new access router after the crossover router is promptly searched.

Embodiments of the present invention may be implemented as a method, apparatus, system, etc. When implemented in software or computer readable code, elements of the present invention can essentially be code segments performing necessary tasks. The computer readable code segments, or a program, can be stored/handled in/by a processor readable medium or transmitted as computer data signals coupled to a carrier wave through a communication medium or network, for example. The processor readable medium can include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, an optical fiber medium, an RF network, etc. Examples of the computer data signals of the computer readable code include any signals that can be transmitted through a transmission medium such as an electronic network channel, an optical fiber, air, an electromagnetic network, and an RF network.

The foregoing embodiments and advantages are merely exemplary and should not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

Thus, although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method for searching for a crossover router in a mobile network having a mobile node, a correspondent node communicating with the mobile node through a specified network, a first access router enabling the mobile node to access the specified network, a second access router accepting the mobile node after being handed over from the first access router, and a crossover router for establishing a new path through the second access router, comprising:

an adjacent router positioned in a direction of the correspondent node on the new path, receiving a message including session information, and comparing the session ID of the session information included in the received message with a currently reserved session ID;

comparing an interface identifier of an interface through which the message is received with an interface identifier of a pre-stored interface if the session ID and the reserved session ID are identical; and recognizing the adjacent router as the crossover router when it is confirmed from the received message that a handover of the mobile node occurs, if the interface identifier of the pre-stored interface and the interface identifier of the interface are not identical.

2. The method as claimed in claim 1, further comprising:
the adjacent router comparing a message flow ID included in the message with an existing flow ID if the interface identifier of the pre-stored interface and the interface identifier of the interface are identical; and recognizing the adjacent router as the crossover router when it is confirmed from the received message that the handover of the mobile node occurs, if the existing flow ID and the message flow ID are not identical.

3. The method as claimed in claim 1, wherein the adjacent router comparing of the session ID comprises the adjacent router transmitting the message to a router in the direction of the correspondent node if the message session ID and the currently reserved session ID are not identical.

4. The method as claimed in claim 3, further comprising:
confirming whether the adjacent router, which is recognized as the crossover router, can perform a communication normal operation with the mobile node and the correspondent node; and searching for another crossover router among adjacent routers on the new path formed through a routing protocol if it is confirmed that the adjacent router is in a failure state and cannot perform a normal communication operation.

5. The method as claimed in claim 4, wherein the confirming of whether the adjacent router can perform the normal operation comprises:

an old router of the crossover router on the new path transmitting a specified search message to the crossover router; and recognizing that the crossover router is in the failure state if a confirmation message of the specified search message is not received in a specified time from the crossover router.

6. The method as claimed in claim 5, wherein the recognizing that the crossover router is in the failure state further comprises:

transmitting the confirmation message, from the crossover router, with a cookie of specified contents; and the old router confirming whether the confirmation message is an effective message by checking the cookie.

7. A mobile network comprising a plurality of access routers for communicating between a mobile node and a correspondent node, through at least one of the plurality of access routers by implementing the method of claim 1.

8. A non-transitory computer readable medium comprising computer readable code implementing the method of claim 1.

* * * * *